United States Patent
Mabrey et al.

(10) Patent No.: US 12,095,112 B2
(45) Date of Patent: Sep. 17, 2024

(54) APPARATUS FOR MITIGATION OF THERMAL EVENT PROPAGATION FOR BATTERY SYSTEMS

(71) Applicant: Spear Power Systems, Inc., Grandview, MO (US)

(72) Inventors: Mitch Mabrey, Grandview, MO (US); Jamie Andes, Grandview, MO (US); Rick Kehler, Grandview, MO (US); Shane Corlman, California, MO (US); Joe Meehan, Excelsior Springs, MO (US); Eliot Myers, Liberty, MO (US)

(73) Assignee: Spear Power Systems, LLC, Grandview, MO (US)

( * ) Notice: Subject to any disclaimer, the term of this patent is extended or adjusted under 35 U.S.C. 154(b) by 470 days.

(21) Appl. No.: 17/490,561

(22) Filed: Sep. 30, 2021

(65) Prior Publication Data

US 2022/0021074 A1    Jan. 20, 2022

Related U.S. Application Data (63) Continuation of application No. PCT/US2019/025155, filed on Apr. 1, 2019.

(51) Int. Cl.
*H01M 50/342* (2021.01)
*H01M 10/04* (2006.01)
(Continued)

(52) U.S. Cl.
CPC ... *H01M 50/3425* (2021.01); *H01M 10/0481* (2013.01); *H01M 10/0525* (2013.01);
(Continued)

(58) Field of Classification Search
None
See application file for complete search history.

(56) References Cited

U.S. PATENT DOCUMENTS

| | | |
|---|---|---|
| 7,351,493 B2 | 4/2008 | Uemoto et al. |
| 2008/0171259 A1 | 7/2008 | Kanai et al. |

(Continued)

FOREIGN PATENT DOCUMENTS

| | | |
|---|---|---|
| EP | 1744383 | 1/2007 |
| JP | 2002151025 | 5/2002 |

(Continued)

OTHER PUBLICATIONS

Notification of Reasons for Refusal in corresponding Japanese Patent Application No. 2021-559029, dated Nov. 16, 2022 (English machine translation attached).

(Continued)

*Primary Examiner* — Wyatt P McConnell
(74) *Attorney, Agent, or Firm* — Hovey Williams LLP (57) ABSTRACT

Apparatus for mitigating propagation of thermal events between battery cells within a battery module assembly (10) is provided. The apparatus comprises one or more of several features that function to prevent a runaway thermal event within one battery cell (48) from triggering a fire or other thermal event within another battery cell within the battery module assembly (10). The apparatus may comprise one or more of: (i) a compressive wrap (88) applied to a battery cell (48); (ii) a layered barrier material (104) positioned between adjacent battery cells (48); (iii) silicone rubber supports (94) positioned adjacent the battery terminals (62, 64), (iv) a light-weight, fire-resistant housing composite panel, and (v) rupturable diaphragms (36) configured to vent gases and ejecta from a battery cell undergoing a thermal event.

19 Claims, 7 Drawing Sheets

(51) Int. Cl.
| | |
|---|---|
| *H01M 10/0525* | (2010.01) |
| *H01M 10/653* | (2014.01) |
| *H01M 10/658* | (2014.01) |
| *H01M 50/178* | (2021.01) |
| *H01M 50/209* | (2021.01) |
| *H01M 50/211* | (2021.01) |
| *H01M 50/222* | (2021.01) |
| *H01M 50/224* | (2021.01) |
| *H01M 50/227* | (2021.01) |
| *H01M 50/229* | (2021.01) |
| *H01M 50/231* | (2021.01) |
| *H01M 50/293* | (2021.01) |
| *H01M 50/358* | (2021.01) |
| *H01M 50/367* | (2021.01) |
| *H01M 50/503* | (2021.01) |
| *H01M 50/507* | (2021.01) |
| *H01M 50/548* | (2021.01) |
| *H01M 50/55* | (2021.01) |
| *H01M 50/553* | (2021.01) |
| *H01M 10/647* | (2014.01) |

(52) U.S. Cl.
CPC ....... *H01M 10/653* (2015.04); *H01M 10/658* (2015.04); *H01M 50/178* (2021.01); *H01M 50/209* (2021.01); *H01M 50/211* (2021.01); *H01M 50/222* (2021.01); *H01M 50/224* (2021.01); *H01M 50/227* (2021.01); *H01M 50/229* (2021.01); *H01M 50/231* (2021.01); *H01M 50/293* (2021.01); *H01M 50/358* (2021.01); *H01M 50/367* (2021.01); *H01M 50/503* (2021.01); *H01M 50/507* (2021.01); *H01M 50/548* (2021.01); *H01M 50/55* (2021.01); *H01M 50/553* (2021.01); *H01M 10/647* (2015.04); *H01M 2200/20* (2013.01); *H01M 2220/20* (2013.01)

(56) References Cited

U.S. PATENT DOCUMENTS

| | | | |
|---|---|---|---|
| 2010/0033130 | A1 | 2/2010 | Mizushima et al. |
| 2010/0247997 | A1 | 9/2010 | Hostler et al. |
| 2011/0003185 | A1 | 1/2011 | Kritzer |
| 2011/0159340 | A1 | 6/2011 | Hu et al. |
| 2011/0212356 | A1 | 9/2011 | Tennessen et al. |
| 2012/0070710 | A1 | 3/2012 | Kritzer et al. |
| 2014/0154539 | A1 | 6/2014 | Kwok et al. |
| 2015/0263396 | A1 | 9/2015 | Kitamura et al. |
| 2015/0349302 | A1 | 12/2015 | Baek et al. |
| 2016/0118728 | A1 | 4/2016 | Herrema et al. |
| 2016/0204392 | A1 | 7/2016 | Kim et al. |
| 2017/0271726 | A1* | 9/2017 | Shen .................. H01M 10/653 |
| 2018/0123174 | A1* | 5/2018 | Riemer .............. H01M 50/569 |
| 2018/0171638 | A1 | 6/2018 | Kostos |
| 2018/0269436 | A1 | 9/2018 | Lee et al. |
| 2018/0269518 | A1 | 9/2018 | Haag et al. |
| 2019/0013556 | A1 | 1/2019 | Sakaguchi et al. |
| 2019/0190098 | A1* | 6/2019 | Abe .................... H01M 50/293 |

FOREIGN PATENT DOCUMENTS

| | | |
|---|---|---|
| JP | 2002208384 | 7/2002 |
| JP | 2010192209 | 9/2010 |
| JP | 2013065526 | 4/2013 |
| JP | 2014135247 | 7/2014 |
| JP | 2015185371 | 10/2015 |
| JP | 2017536660 | 12/2017 |
| KR | 100717754 | 5/2007 |
| WO | 2005096412 | 10/2005 |
| WO | 2017159528 | 9/2017 |
| WO | 20170181283 | 10/2017 |

OTHER PUBLICATIONS

Supplementary Search Report in corresponding European Patent Application Serial No. 19923644.9, dated Mar. 10, 2023.
International Search Report and Written Opinion in corresponding PCT Application Serial No. PCT/US2019/025155, dated Aug. 6, 2019.

* cited by examiner

APPARATUS FOR MITIGATION OF THERMAL EVENT PROPAGATION FOR BATTERY SYSTEMS

CROSS-REFERENCE TO RELATED APPLICATIONS

The present application is a continuation of International Patent Application No. PCT/US2019/025155, filed Apr. 1, 2019, incorporated by reference herein in its entirety.

BACKGROUND OF THE INVENTION

Field of the Invention

The present invention is generally directed toward apparatus for mitigating propagation of thermal events between battery cells within a battery module assembly. The thermal events, which originate within one of the battery cells, may include the discharge of flames, heat and ejecta from a battery cell, and can create a serious risk of initiating a similar thermal event in an adjacent battery cell within the same battery module or other battery modules within the same battery system. The mitigating apparatus provides passive protection for battery systems and serves as a failsafe mechanism for other, active protection systems that may be provided as a part of the overall battery system.

Description of the Prior Art

The demand for alternative, environmentally-friendly sources of powering machines and equipment continues to surge. In particular, demand has grown for machines that rely upon battery systems to provide power for their operation as opposed to more conventional means of power generation, such as through burning of fossil fuels. While the rise in popularity of electric cars and other machines conventionally powered by internal-combustion engines is manifest, many other types of vehicles that already use electric propulsion systems continue to rely upon fossil-fuel powered generators in order to provide the electricity needed for their propulsion and other operational systems. These vehicles include cargo ships, ferries, aircraft, mining equipment, aviation ground service equipment, hyperloop pods, and locomotives. Aside from transportation applications, battery-powered electrical systems can find use in many off-grid applications that presently rely upon either fossil fuel power generation, or less-consistent sources of clean energy such as solar and wind.

Lithium ion battery cells are presently preferred for many power storage applications. However, safety concerns associated with the use of these cells is well-known and steps must be taken to ensure safe operation of large-scale battery systems employing lithium ion battery cells. One particular operational safety concern associated with lithium ion battery cell usage is thermal energy management. Lithium ion cells tend to release significant quantities of heat during normal cell operation. The generation of this heat needs to be managed, and the system design should account for adequate cooling and/or heat dissipation so that the battery cells can operate efficiently and safely. If a battery cell overheats, a runaway chemical reaction within the battery cell can result, sometimes with very serious consequences. For instance, a runaway cell can explode, catch fire, and/or eject hot gases or material therefrom. The hot ejecta, gas, and flame can then be spread to adjacent battery cells and cause further runaway cells thereby exacerbating an already serious condition.

Lithium ion battery systems are often equipped with several active monitoring and mitigation systems that continuously monitor a host of parameters associated with battery system operation and are operable to take steps to detect signs of the beginning of an untoward thermal event and mitigate it before it becomes a problem. Such mitigating steps include taking the cell in question offline, activating fire suppressing systems, and/or alerting service technicians to inspect the cell or module in question. However, some industry regulatory authorities require that passive back-up or failsafe systems be provided in case the active mitigation systems fail or become disabled. The Norwegian Maritime Authority is one such regulatory body that requires the presence of a passive protection system for all battery-powered and hybrid vessels operating in its waters.

Thus, a need exists for apparatus that can be used with battery systems to provide for protection from and prevent propagation of thermal events associated with battery cells contained therein.

SUMMARY OF THE INVENTION

According to one embodiment of the present invention there is provided a prismatic battery cell that comprises a compressive wrap disposed around at least a portion of the outer cell case within which the contents of the battery cell are contained. The compressive wrap is operable to constrain hoop stresses acting upon the cell case during thermal expansion of the cell. In preferred embodiments, the outer cell case presents a pair of opposed, generally planar surfaces interconnected by opposed sidewall segment pairs. The compressive wrap is disposed around the cell case in covering relationship to at least a portion of the planar surfaces and at least a portion of one of the sidewall segment pairs. In particularly preferred embodiments, there is at least one sidewall segment of one of the sidewall segment pairs that is uncovered by the compressive wrap and configured to create at least one predetermined point of cell case failure during a thermal event in the cell through which ejecta, gas, and or flames are released from the cell.

According to another embodiment of the present invention there is provided a method of constraining a prismatic battery cell comprising a cell case in which the contents of the battery cell are contained. In preferred embodiments, the cell case presents a pair of opposed, generally planar surfaces interconnected by opposed sidewall segment pairs. The method comprises applying a compressive wrap to the cell case. In particularly preferred embodiments, the compressive wrap is applied in covering relationship to at least a portion of the planar surfaces and a least a portion of one of the sidewall segment pairs. Generally, the compressive wrap functions to constrain hoop stresses acting upon the cell case during thermal expansion of the cell. In preferred embodiments, at least one sidewall segment of one of the sidewall segment pairs is left uncovered by the compressive wrap thereby creating at least one predetermined point of cell case failure during a thermal event in the cell through which ejecta, gas, and/or flames are released from the cell.

According to another embodiment of the present invention there is provided a prismatic battery cell comprising an outer cell case in which the contents of the battery cell are contained. The cell case presents a pair of opposed, generally planar surfaces interconnected by opposed sidewall segment pairs. There is at least one cell flange extending from one or more of the sidewall segments. At least two terminals extend from one or more of the sidewall segments. The at least two terminals are at least partially surrounded by the at least one cell flange. There is at least one pliable, temperature-resistant strip of material disposed on at least one side of and overlying the at least one cell flange.

According to another embodiment of the present invention there is provided a method of protecting a battery cell from physical and thermal damage. The battery cell comprises an outer cell case in which the contents of the battery cell are contained. The cell case presents a pair of opposed, generally planar surfaces interconnected by opposed sidewall segment pairs. At least one cell flange extends from one or more of the sidewall segments. At least two terminals extend from one or more of the sidewall segments. The at least two terminals are at least partially surrounded by the at least one cell flange. The method comprises placing at least one pliable, temperature-resistant strip of material on at least one side of and overlying the at least one cell flange.

According to another embodiment of the present invention there is provided a battery module assembly. In preferred embodiments, the battery module assembly comprises at least two battery cells and one or more of the following:

(i) a layered barrier material disposed between the at least two battery cells configured to thermally isolate and control, prevent, or mitigate cell-to-cell propagation of a thermal event occurring within at least one of the battery cells;

(ii) a battery module housing configured to house a plurality of battery cells and comprising at least one composite panel comprising an outboard metallic layer, an inboard layer of an FR4-rated sheet material, and at least one graphitic carbon sheet positioned therebetween;

(iii) one or more busbars operable to connect the at least two battery cells located within a battery module housing, and one or more busbar shields configured to at least partially cover the one or more busbars and shield electrical components located outboard of the one or more busbars and within a passage of the housing from contacting the one or more busbars during a thermal event associated with one or more of the plurality of battery cells; and (iv) a battery module housing comprising a passage within the housing and at least one outlet interconnecting the passage and the environment outside of the housing, there being a rupturable diaphragm normally covering the passage and blocking communication between the passage and the environment outside the housing.

In preferred embodiments of the present invention, the layered barrier material includes at least two sheets of an anisotropic material. At least one of the sheets of anisotropic material is in direct facing contact with one of the at least two battery cells, and at least one other of the sheets of anisotropic material is in direct facing contact with one other of the at least two battery cells. The at least two sheets of anisotropic material have a high thermal conductivity in the in-plane direction and are operable to direct thermal energy away from a surface of the cell with which the sheet is in contact. The at least two sheets of anisotropic material are operable to prevent and/or retard penetration of a flame originating from the battery cell with which it is in contact in a direction toward the at least one other battery cell. The layered barrier material optionally includes at least one sheet, and preferably at least two sheets, of a thermal insulation material having high thermal resistance. When at least two sheets of the thermal insulation material are present, one of the at least two sheets of thermal insulation material is positioned in direct facing contact with one of the at least two sheets of anisotropic material and the other of the at least two sheets of thermal insulation material is positioned in direct facing contact with the other of the at least two sheets of anisotropic material. The at least two sheets of thermal insulation material are operable to retard and/or impede the flow of heat originating within one of the battery cells in a direction toward the at least one other battery cell. The layered barrier material further includes a compliant material positioned between the at least two sheets of anisotropic material and optional thermal insulation material under compression. The compliant material is operable for maintaining the at least two sheets of anisotropic material in direct facing contact with the at least two battery cells regardless of thermally-induced changes in volume that the at least two battery cells may experience during normal cell operation.

In preferred embodiments of the present invention, the outboard metallic layer of the battery module housing composite panel comprises aluminum, and the FR4-rated sheet material comprises a woven fiberglass and epoxy resin laminate material. The composite panel defines, at least in part, a passageway configured to conduct a flow of ejecta and gas from a thermal event associated with one or more battery cells within the battery module housing toward an outlet formed in the housing.

In preferred embodiments of the present invention, the busbar shields comprise an FR4-rated sheet material, and more preferably a woven fiberglass and epoxy resin laminate material. The busbar shields operate to prevent wiring running within a passage of the housing whose insulation may have become damaged as a result of a thermal event associated with one or more of the battery cells, from contacting one of the busbars and causing a short circuit.

According to another embodiment of the present invention there is provided a battery module assembly. The battery module assembly comprises a battery module housing configured to house a plurality of prismatic battery cells. One or more of the prismatic battery cells comprises an outer cell case in which the contents of the battery cell are contained. The cell case presents a pair of opposed, generally planar surfaces interconnected by opposed sidewall segment pairs. A compressive wrap is disposed around the cell case in covering relationship to at least a portion of the planar surfaces and at least a portion of one of the sidewall segment pairs. The compressive wrap is operable to constrain hoop stresses acting upon the cell case during thermal expansion of the cell. There is at least one sidewall segment of one of the sidewall segment pairs that is uncovered by the compressive wrap and is configured to create at least one predetermined point of cell case failure during a thermal event in the cell through which ejecta, gas, and/or flames are released from the cell. The battery module assembly further comprises a layered barrier material disposed in between at least two of the plurality of prismatic battery cells. The layered barrier material is configured to thermally isolate and control or prevent cell-to-cell propagation of a thermal event occurring within at least one of the battery cells. The layered barrier material comprises at least two sheets of an anisotropic material. At least one of the sheets of anisotropic material is in direct facing contact with one of the at least two battery cells. At least one other of the sheets of anisotropic material is in direct facing contact with one other of the at least two battery cells. The layered barrier material optionally comprises at least one, and preferably two, sheets of a thermal insulation material. When two sheets of the thermal insulation material are used, one of the at least two sheets of thermal insulation material is positioned in direct facing contact with one of the at least two sheets of anisotropic material, and the other of the at least two sheets of thermal insulation material is positioned in direct facing contact with the other of the at least two sheets of anisotropic material. The layered barrier material further comprises a compliant material positioned between the at least two sheets of anisotropic material and optional thermal insulation material under compression. The compliant material is operable for maintaining the at least two sheets of anisotropic material in direct facing contact with the at least two battery cells.

According to another embodiment of the present invention there is provided a battery module assembly comprising a battery module housing configured to house a plurality of prismatic battery cells. One or more of the prismatic battery cells comprises an outer cell case in which the contents of the battery cell are contained. The cell case presents a pair of opposed, generally planar surfaces interconnected by opposed sidewall segment pairs. A compressive wrap is disposed around the cell case in covering relationship to at least a portion of the planar surfaces and at least a portion of one of the sidewall segment pairs. The compressive wrap is operable to constrain hoop stresses acting upon the cell case during thermal expansion of the cell. There is at least one sidewall segment of one of the sidewall segment pairs that is uncovered by the compressive wrap and is configured to create at least one predetermined point of cell case failure during a thermal event in the cell through which ejecta and gas are released from the cell. The one or more battery cells comprises at least one cell flange extending from one or more of the sidewall segments and at least two terminals extending from one or more of the sidewall segments. The at least two terminals are at least partially surrounded by the at least one cell flange. There is at least one pliable, temperature-resistant strip of material disposed on at least one side of and overlying the at least one cell flange.

According to another embodiment of the present invention there is provided a battery module assembly comprising a battery module housing configured to house a plurality of battery cells and a layered barrier material disposed in between at least two of the plurality of battery cells. The layered barrier material is configured to thermally isolate and control or prevent cell-to-cell propagation of a thermal event occurring within at least one of the battery cells. The layered barrier material is configured to thermally isolate and control or prevent cell-to-cell propagation of a thermal event occurring within at least one of the battery cells. The layered barrier material comprises at least two sheets of an anisotropic material. At least one of the sheets of anisotropic material is in direct facing contact with one of the at least two battery cells. At least one other of the sheets of anisotropic material is in direct facing contact with one other of the at least two battery cells. The layered barrier material further comprises at least two sheets of a thermal insulation material. One of the at least two sheets of thermal insulation material is positioned in direct facing contact with one of the at least two sheets of anisotropic material, and the other of the at least two sheets of thermal insulation material is positioned in direct facing contact with the other of the at least two sheets of anisotropic material. The layered barrier material further comprises a compliant material positioned between the at least two sheets of thermal insulation material under compression. The compliant material is operable for maintaining the at least two sheets of anisotropic material in direct facing contact with the at least two battery cells. Each of the plurality of battery cells comprises an outer cell case in which the contents of the battery cell are contained. The cell case presents a pair of opposed, generally planar surfaces interconnected by opposed sidewall segment pairs. At least one cell flange extends from one or more of the sidewall segments. At least two terminals extend from one or more of the sidewall segments. The at least two terminals are at least partially surrounded by the at least one cell flange. There is at least one pliable, temperature-resistant strip of material disposed on at least one side of and overlying the at least one cell flange.

According to another embodiment of the present invention there is provided a battery module assembly comprising a battery module housing configured to house a plurality of prismatic battery cells. One or more of the prismatic battery cells comprise an outer cell case in which the contents of the battery cell are contained. The cell case presents a pair of opposed, generally planar surfaces interconnected by opposed sidewall segment pairs. The one or more prismatic battery cells further comprise a compressive wrap disposed around the cell case in covering relationship to at least a portion of the planar surfaces and at least a portion of one of the sidewall segment pairs. The compressive wrap is operable to constrain hoop stresses acting upon the cell case during thermal expansion of the cell. There is at least one sidewall segment of one of the sidewall segment pairs that is uncovered by the compressive wrap and configured to create at least one predetermined point of cell case failure during a thermal event in the cell through which ejecta and gas are released from the cell. The battery module housing comprises at least one composite panel comprising an outboard metallic layer, an inboard layer of an FR4-rated sheet material, and at least one graphitic carbon sheet positioned therebetween. The composite panel defines at least in part a passageway configured to conduct a flow of ejecta and gas from a thermal event associated with one or more battery cells within the battery module housing toward an outlet formed in the housing.

According to another embodiment of the present invention there is provided a battery system comprising a plurality of any of the battery modules described herein.

According to another embodiment of the present invention there is provided a vehicle comprising one or more of the prismatic battery cells or battery modules, or battery systems described herein. In preferred embodiments, the vehicle is a marine vessel, such as a ship or boat.

According to an embodiment of the present invention, a method of thermally isolating battery cells within a battery module assembly comprising at least two battery cells is provided. The method comprises positioning a layered barrier material in between the at least two battery cells. The layered barrier material is configured to thermally isolate and control or prevent cell-to-cell propagation of a thermal event occurring within at least one of the battery cells. The positioning of the layered barrier material comprises placing a first sheet of anisotropic material in direct facing contact with one of the at least two battery cells. The anisotropic material has a high thermal conductivity in the in-plane direction and is operable to direct thermal energy away from a surface of the cell with which the sheet is in contact. The anisotropic material is operable to prevent and/or retard penetration of a flame originating from the battery cell with which it is in contact in a direction toward the at least one other battery cell. Optionally, a first sheet of a thermal insulation material having a high thermal resistance is placed in direct facing contact with the first sheet of anisotropic material. The thermal insulation material is operable to retard and/or impede the flow of heat originating within one of the battery cells in a direction toward the at least one other battery cell. A second sheet of the anisotropic material is placed in direct facing contact with the other of the at least two battery cells. Optionally, a second sheet of the thermal insulation material is placed in direct facing contact with the second sheet of anisotropic material. A compliant material is positioned between the first and second sheets of anisotropic material and optional thermal insulation material and maintained under compression therebetween. The compliant material maintains the at least two sheets of anisotropic material in direct facing contact with the at least two battery cells regardless of thermally-induced changes in volume that the at least two battery cells may experience during normal cell operation.

According to an embodiment of the present invention, a battery module assembly is provided that comprises a battery module housing, a plurality of battery cells located within the battery module housing, and a layered barrier material in contact with adjacent battery celled. The battery module housing has a longitudinal axis that extends the length of the battery module housing and a transverse axis that is normal to the longitudinal axis. The layered barrier material comprises at least two sheets of anisotropic material. At least one of the sheets of anisotropic material is in direct facing contact with one of the battery cells, and at least one other of the sheets of anisotropic material is in direct facing contact with at least one other of the battery cells. The battery module housing is configured to apply a compressive force to the plurality of battery cells in a direction parallel to the transverse axis. A compressive force also is applied to the plurality of battery cells in a in a direction that is parallel to the longitudinal axis.

According to an embodiment of the present invention, a battery module assembly is provided that comprises a battery module housing, a plurality of battery cells located within the battery module housing, and at least one passageway located between the battery module housing and the plurality of battery cells. The at least one passageway is configured to conduct a flow of ejecta and gas from a thermal event associated with one or more battery cells within the battery module housing toward an outlet formed in the housing. The outlet is covered with a rupturable diaphragm configured to open in response to the thermal event and permit communication between the passageway and the exterior of the housing. The rupturable diaphragm also is configured to resist opening due to a thermal event that is external to the housing.

According to an embodiment of the present invention, a prismatic battery cell assembly is provided that comprises an outer cell case, at least one cell flange, at least two terminals, and a bead of a pliable, temperature-resistant material disposed about the periphery of the cell case. The cell case has a pair of opposed, generally planar surfaces interconnected by opposed sidewall segment pairs. The at least one cell flange extends from one or more of the sidewall segments. The at least two terminals extend from one of the sidewall segments and are at least partially surrounded by the at least one cell flange. The bead of a pliable, temperature-resistant material is disposed about a majority of the periphery of the sidewall segments and overlies at least a portion of the at least one cell flange. The bead is operable to apply a compressive force to the outer cell case.

DETAILED DESCRIPTION OF THE PREFERRED EMBODIMENT

Definitions

As used herein, the term "battery cell" refers to an electrochemical cell that can generate electrical energy from a chemical reaction. The battery cell may be an electrolytic cell in which a cathode and anode are separated by an electrolyte. An exemplary battery cell for use with the present invention is a lithium ion battery cell. There are many types of electrolytes that may be used in lithium ion battery cells including, but not limited to mixtures of organic carbonates such as ethylene carbonate or diethyl carbonate containing complexes of lithium ions. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). It is noted that many concepts of the present invention described herein can also be applicable to other electrochemical devices and energy storage devices besides those based upon battery cells, including lithium ion capacitors and supercapacitors. For expediency purposes, all such non-battery devices are encompassed by the term "battery cell" as used herein.

As used herein, the term "battery module" refers to a collection of two or more battery cells. The battery cells within the battery module may be connected in series, in parallel, or there may be cells connected in series and cells connected in parallel within the same module.

As used herein, the term "battery system" refers to a collection of two or more battery modules.

As used herein, the term "FR4-rated" refers to a National Electrical Manufacturers Association (NEMA) grade designation for certain composite materials, especially glass-reinforced epoxy laminate materials that are flame retardant.

As used herein, the term "graphitic carbon" refers to allotropes of carbon having graphene as a basic structural element including, but not limited to, graphite, charcoal, carbon nanotubes, and fullerene.

As used herein, the term "runaway event" means an uncontrolled exothermic chemical reaction occurring within a battery cell that may result in the release of heat, flame, gases, and/or other particulate matter (i.e., ejecta) from the cell. A runaway event is generally considered an extremely hazardous condition and one that may result in a fire that could potentially propagate to other battery cells within the vicinity of the cell in which the event originates.

Figure 1:
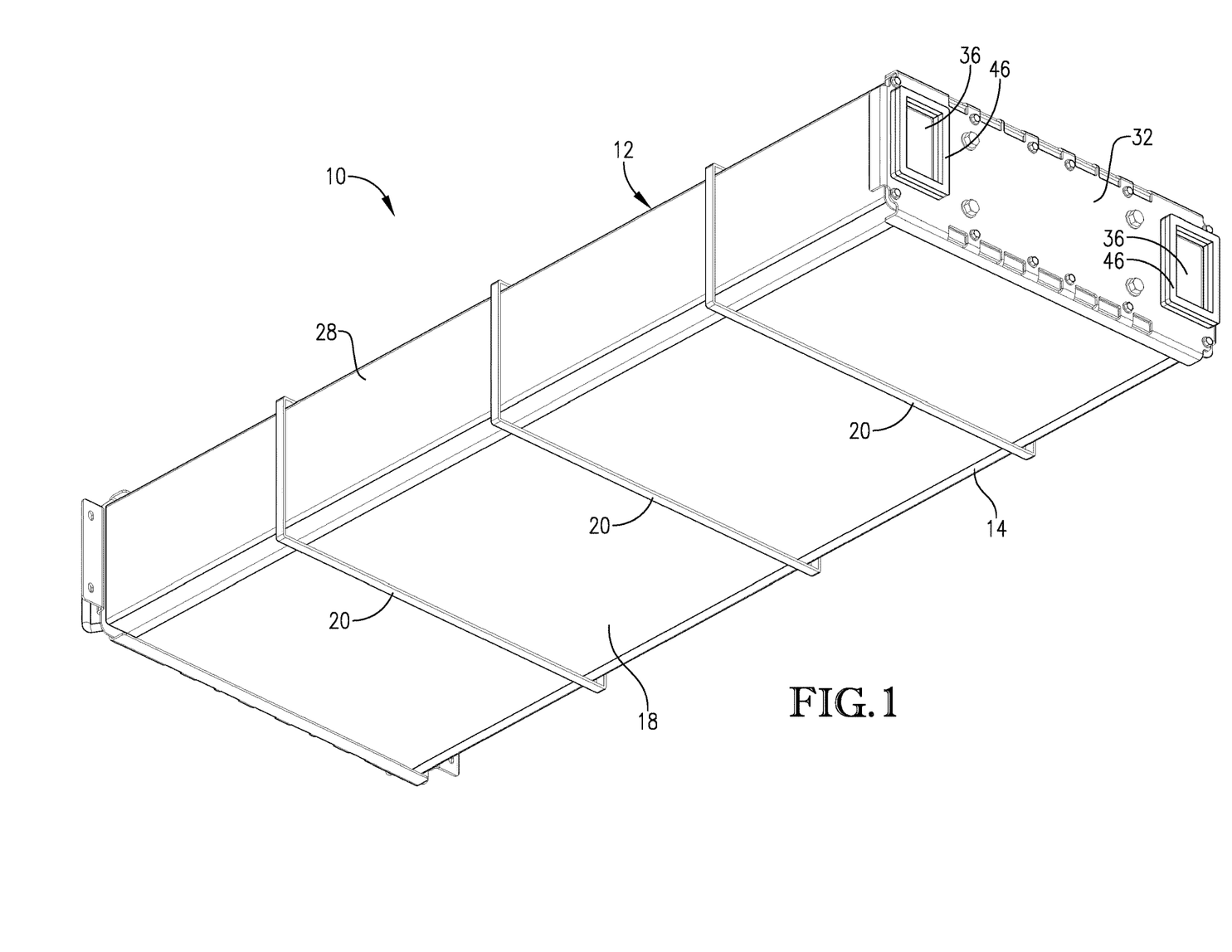
FIG. 1 is an isometric view of a battery module assembly according to the present invention illustrating the end of the assembly comprising rupturable diaphragms covering the battery module housing outlets.
Figure 2:
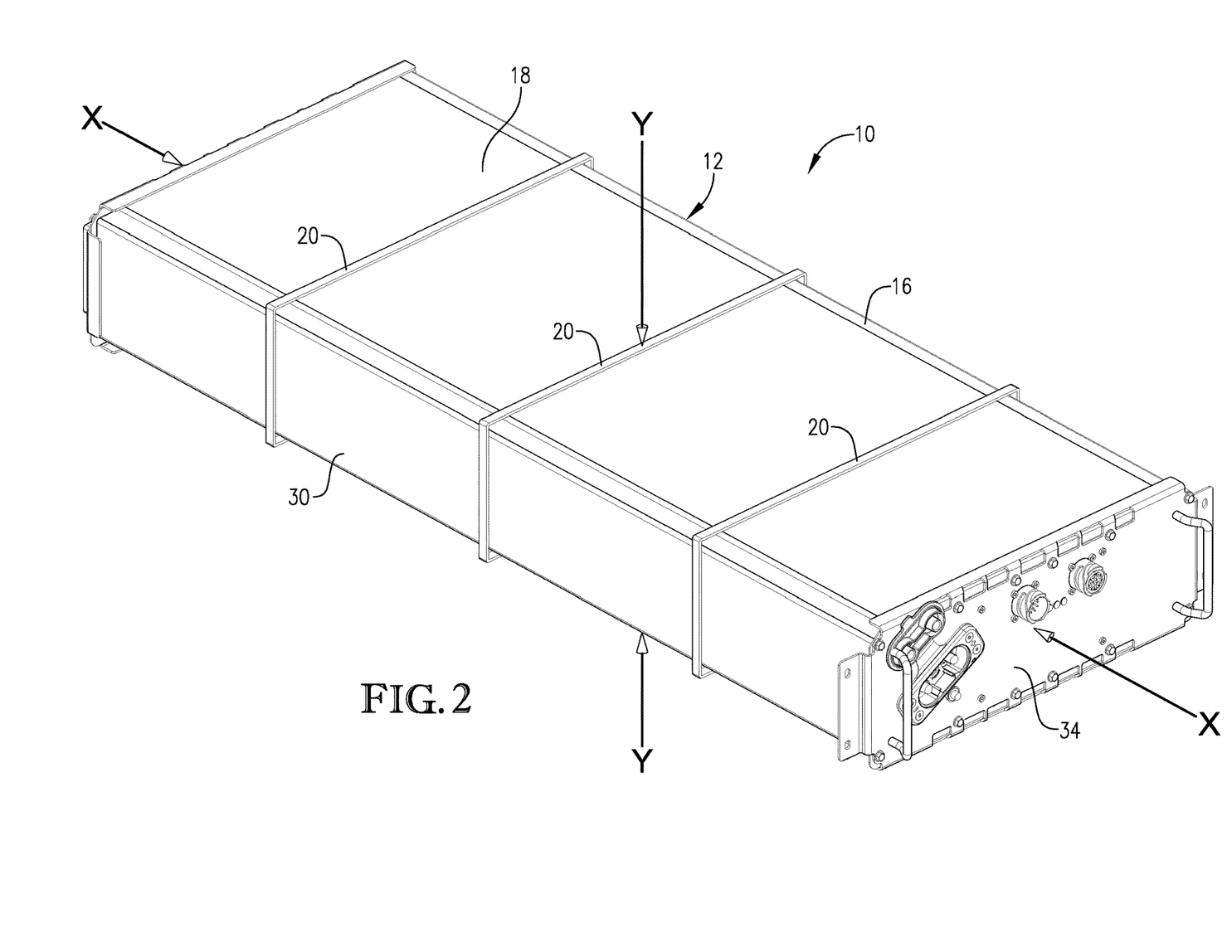
FIG. 2 is an isometric view of the battery module assembly illustrating the end of the assembly comprising various electrical connectors.

Turning now to FIGS. 1 and 2, an exemplary battery module assembly 10 according to one embodiment of the present invention is illustrated. Battery module assembly 10 generally comprises a battery module housing 12, which encloses a plurality of battery cells and other associated components therein, which are described in greater detail below. As illustrated, housing 12 is rectangular in shape, although this need not always be the case, and is comprised of six assembled panels. Panels 14 and 16 are generally the largest panels and are positioned opposite each other. One or more of panels 14, 16 may comprise a heat transfer surface 18, the function of which is described in greater detail below.

Housing 12 further comprises an opposed pair of composite side panels 28, 30. The construction of side panels 28, 30 is described in further detail below. Side panels 28, 30 interconnect panels 14, 16 along longitudinally extending side margins thereof. End panels 32, 34 are positioned transversely to side panels 28, 30 and effectively serve as end caps of housing 12. It is observed that end panel 32 may be equipped with rupturable diaphragms 36, whose function is explained below. End panel 34 may comprise various electrical connectors to which power leads (not shown) and monitoring and control systems (not shown) may be attached to the battery module 10.

One or more of the panels making up housing 12, and in particular panels 14, 16, 28, and 30, may comprise a light-weight metal, such as aluminum, to reduce the overall weight of the housing. However, other metals, such as steel, can be used. In certain embodiments, panels 14, 16, 28, and 30 comprise a lightweight, high-strength material such as aluminum or carbon fiber.

In certain embodiments, it is preferable, that once all panels are assembled, housing 12 forms a generally watertight structure that prevents, or at least minimizes, entry of moisture, dust, and/or other foreign matter into the interior of the housing. Likewise, and except as explained below with reference to diaphragms 36, housing 12 also prevents material associated with or generated from the battery cells located within the housing from escaping in an uncontrolled manner. Housing 12 further comprises a plurality of strap members 20 disposed circumferentially about panels 14, 16, 28, and 30. The function of strap members 20 is described in greater detail below; however, generally strap members 20 provide a compressive force to the panels they contact, and in particular panels 14 and 16. Strap members 20 are preferably made from steel, but any suitable material may be used.

A plurality of battery modules 10 may be assembled together into a battery system that is sized to meet the needs of a particular application. The battery system may include racks or shelving units (not shown) onto which the battery modules 10 may be secured. Battery modules 10 can be connected in series and/or in parallel within the overall battery system as the needs of the particular application require.

Figure 3:
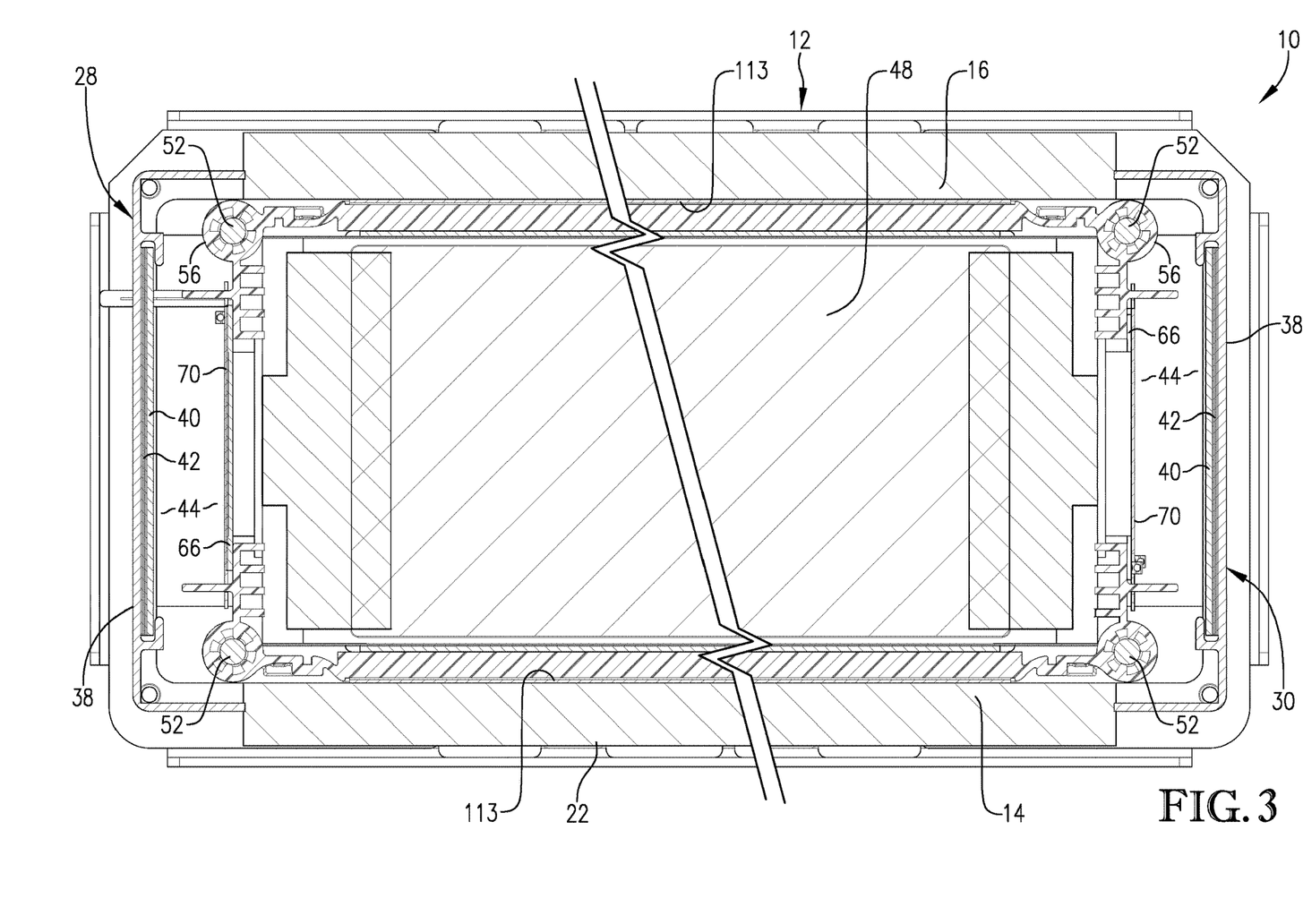
FIG. 3 is a broken cross-sectional view of the battery module assembly with a portion of the assembly removed for ease of illustration.

FIG. 3 illustrates composite side panels 28, 30 in greater detail. These panels are configured to provide enhanced protection against thermal events originating within a battery cell contained within housing 12. As explained in greater detail below, the battery cells are specially configured to vent flame, gas, and other ejecta in a direction toward at least one of side panels 28, 30 should the cell experience a runaway thermal event. Conventionally, panels exposed to such conditions were constructed of single-material sheets, such as steel, that could withstand the high-temperatures associated with these types of thermal events. However, in some applications, such materials are impractical as they add considerable weight to the battery module housing. Accordingly, in certain embodiments of the present invention, side panels 28, 30 are constructed of a composite material that is much lighter in weight but possesses adequate heat-resistant characteristics for use as a housing panel.

Composite side panels 28, 30 comprise an outboard metallic or non-metallic structural layer 38, an inboard layer 40, and at least one graphitic carbon sheet 42 positioned therebetween. Preferably, panels 28, 30 comprise a plurality of graphitic carbon sheets stacked 42 together. In preferred embodiments, the FR4-rated sheet material comprises a woven fiberglass and epoxy resin laminate material. In particularly preferred embodiments, the FR4-rated material comprises a Garolite material having a tensile strength of 241-345 MPa, an impact strength of 30-65.4 kg-cm/cm, a Rockwell hardness of M100 to M110, and a thickness of 0.127 mm to 2.54 cm.

The FR-4 rated sheet material serves as a flame barrier that prevents penetration of flames being ejected by a battery cell within the battery module 10. The graphitic carbon sheet or sheets provide a thermal barrier to protect the outboard metallic layer 38 from temperatures that could cause it to melt. The graphitic carbon sheets advantageously transmit heat in an in-plane direction rather than in a direction normal to the plane of the sheet. Thus, the graphitic carbon sheet transmits heat that originates from a battery cell away from the outboard metallic layer 38. In certain embodiments, the outboard metallic layer 38 comprises a lightweight metal or metal alloy. Preferably, structural layer 38 comprises aluminum, an aluminum alloy, carbon fiber, or a synthetic resin material. The laminate structure of side panels 28, 30 permit light-weight, relatively low melting-point metals such as aluminum to be used to be used in the construction of battery module housing 12, which saves considerable weight, which can be a tremendous advantage particularly when the battery modules 10 are being installed within a vehicle where weight is an important design consideration.

Composite panels 28, 30 define, at least in part, respective passageways 44 within housing 12 that are configured to conduct a flow of ejecta and gas from a thermal event associated with one or more battery cells within housing 12 toward respective outlets 46 formed in the housing. It is noted that the battery module 10 illustrated in the Figures utilizes battery cells that are configured to fail in the direction of composite side panels 28 and 30. Thus, housing 12 is configured with a passageway 44 at each end of the stack of battery cells to conduct ejecta and gas towards a respective outlet 46. However, it is within the scope of the present invention for battery module 10 to utilize battery cells that are configured to fail in only one direction, thus requiring the use of only one composite side panel 28, one passageway 44, and one outlet 46.

As illustrated, outlet 46 is formed in end panel 32 so that the hot gas and ejecta is conducted away from the various electrical components carried by end panel 34. Diaphragms 36 normally seal outlets 46 and are configured to open in response to the thermal event and permit communication between the passageway 44 and the exterior of housing 12. In certain embodiments, diaphragms 36 are formed from a synthetic resin film material such as silicone rubber, KAPTON (Polyimide), TEFLON & GORE-TEX (Polytetrafluoroethylene), and the like. However, it is also within the scope of the present invention for other materials, such as thin metallic foils, to be used as diaphragm 36. In one aspect of the invention, diaphragms 36 function as one-way valves that rupture under the pressure of a thermal event occurring within module 10 but are sufficiently heat-resistant to avoid rupturing due to a thermal event occurring and being vented from an adjacent module in close proximity thereto. Thus, diaphragms 36 may also protect module 10 from external hazards as well as help alleviate hazards that are internal to module 10.

Figure 4:
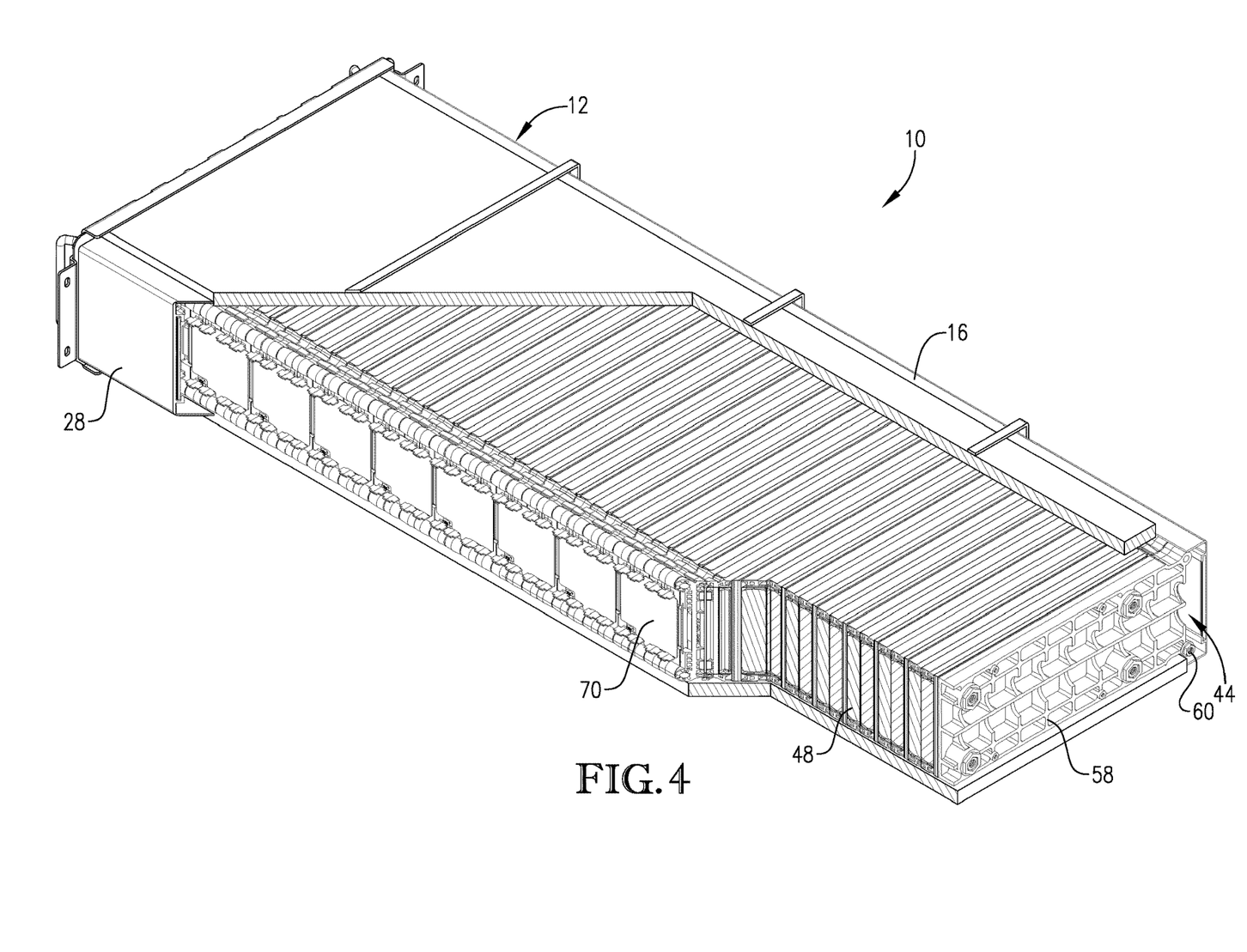
FIG. 4 is an isometric, sectioned view of the battery module assembly illustrating the stack of battery cells contained within the battery module housing.
Figure 5:
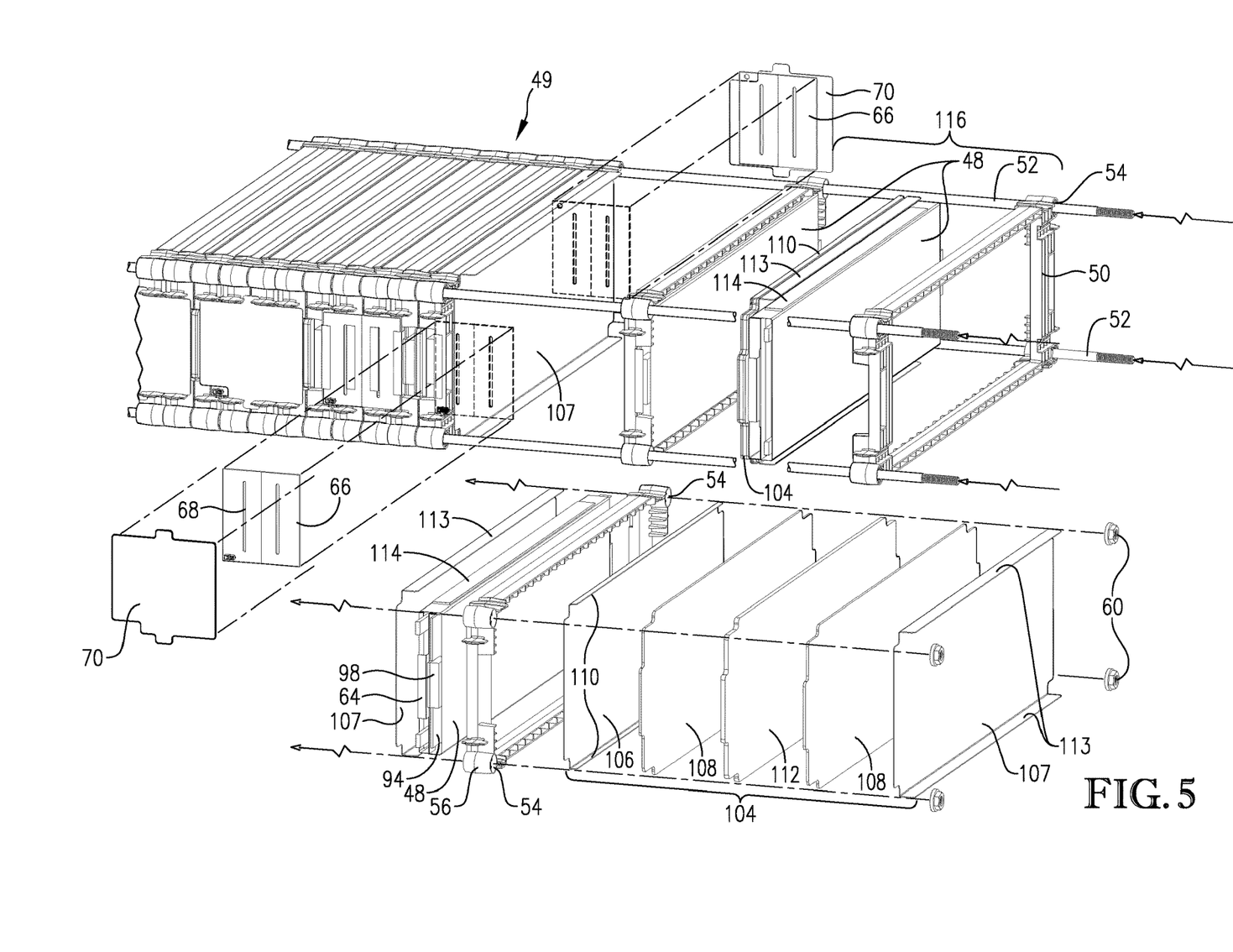
FIG. 5 is an expanded view of a stack of battery cell units contained with the battery module housing.

Turning now to FIGS. 4 and 5, battery module 10 comprises a plurality of battery cells 48. As illustrated, battery cells 48 comprise prismatic battery cells, but it is within the scope of the present invention for other types of battery cells to be used with many of the features disclosed and described herein. Generally, though, the prismatic battery cells are placed within a cell frame 50. A plurality of frames 50 are stacked together and fastened by inserting threaded rods 52 through orifices 54 formed in respective corner sections 56 of each frame. Frames 50 are generally rigid and made from an inert material, such as a synthetic resin or thermoplastic plastic material. A preferred material from which fames 50 can be constructed is acrylonitrile butadiene styrene (ABS), although any suitable thermoplastic material may be used. Once a desired number of cells 48 have been stacked together, and end plate 58 is attached and secured to rods 52 with nuts 60. However, other devices can be used to secure the stacks of cells together including cables and bands.

Figures 6, 7:
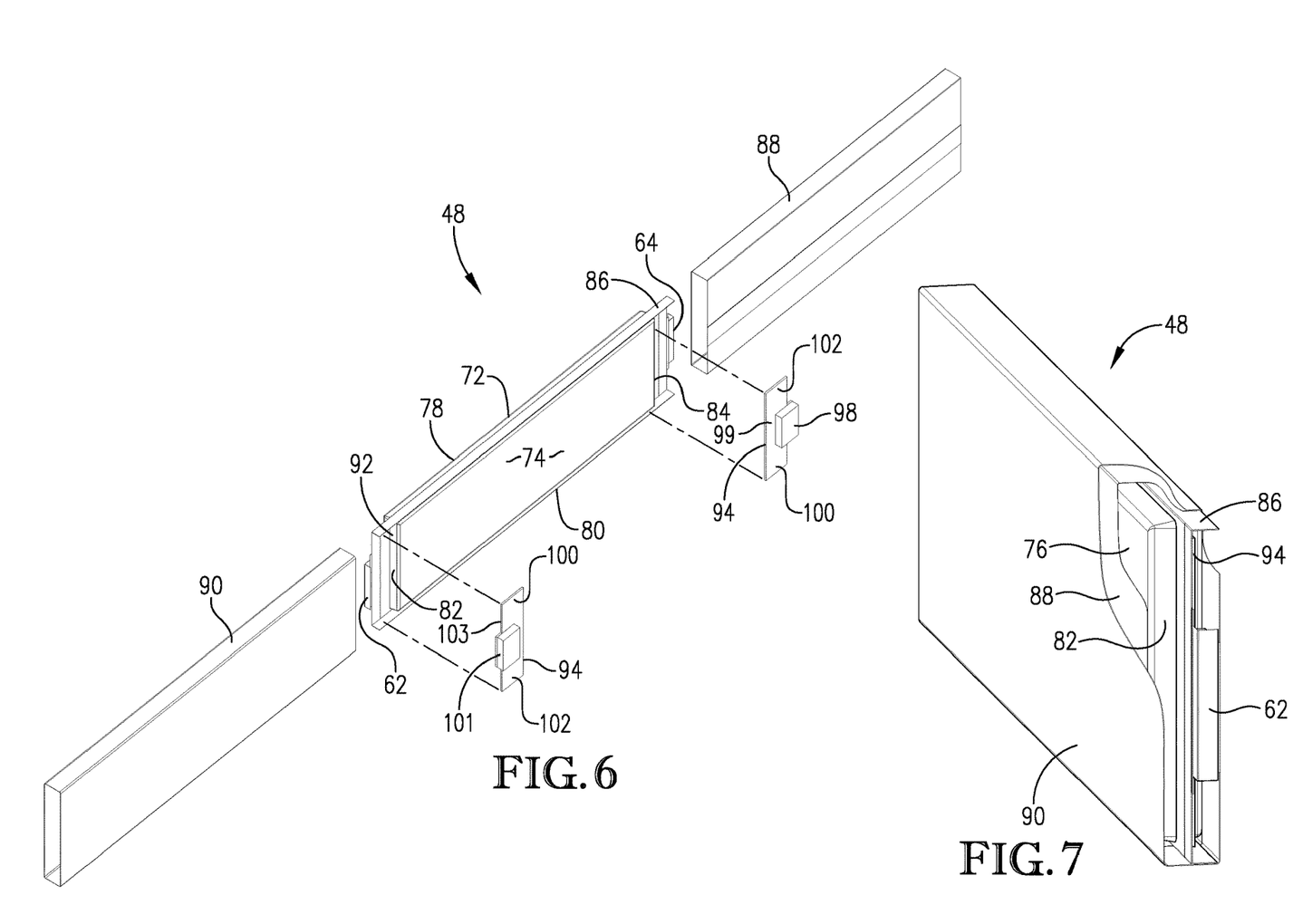
FIG. 6 is an expanded view of a battery cell in accordance with one embodiment of the present invention.
FIG. 7 is an isometric end view of the fully-assembled battery cell.

Each battery cell 48 comprises at least two terminals 62, 64 extending therefrom (see, FIG. 6). As illustrated, one terminal extends from opposite ends of the cell 48, although it is within the scope of the present invention for terminals 62, 64 to extend from the same end of the cell. The battery module assembly 10 comprises one or more busbars 66 that are operable to connect the plurality of battery cells 48 located within housing 12. Busbars 66 are preferably formed of any conductive material, such as copper or aluminum, and comprise a slot 68 that is configured to receive terminals 62, 64.

It is noted that passageways 44 can carry wiring and/or other electrical components used by battery module assembly. Upon suffering a thermal event, the flame, ejecta, and gases expelled from a battery cell 48 can damage wire insulation thereby exposing the bare wires of these components. As busbars generally face passageways 44, if the bare wiring and busbars were to come into contact, a short circuit could be created thereby introducing further hazards, such as the triggering of another runaway cell, into an already perilous situation. Thus, in certain embodiments of the present invention, one or more busbar shields 70 may be installed over busbars 66 to at least partially cover the one or busbars 66 and shield electrical components that are located outboard of the one or more busbars 66 and within passage 44 from contacting the one or more busbars 66 during a thermal event associated with one or more of the battery cells 48. In certain embodiments, the busbar shields 70 are formed from a fire-resistant material, preferably an FR4-rated sheet material, such as that described above and used with composite side panels 28, 30. Busbar shields 70 may also operate to block flames escaping from one battery cell 48 from contacting adjacent battery cells.

FIGS. 6 and 7 illustrate in greater detail an exemplary battery cell 48 that may be used with embodiments of the present invention. As previously mentioned, however, it is within the scope of the present invention for other types and configurations of battery cells to be used and the figures and their accompanying description should not be taken as limiting upon the scope of the invention in any way.

Battery cell 48 comprises an outer cell case 72 in which the contents of the battery cell, such as the cathode, anode, and electrolyte, are contained. In certain embodiments, the cell case comprises a pouch that is formed of a film material, such as a polymer/aluminum composite material that is hermetically sealed at least on one side. The cell case 72 presents a pair of opposed, generally planar surfaces 74, 76. In certain embodiments, surfaces 74, 76 make up the majority of the surface area of the cell case. These planar surfaces 74, 76 are interconnected by opposed sidewall segment pairs 78, 80, 82, 84. Sidewall segments 78, 80 extend parallel to the longitudinal axis of battery cell 48, and sidewall segments 82, 84 extend transverse to the longitudinal axis of battery cell 48. Some of the case material may extend beyond one or more of the sidewall segments 78, 80, 82, 84 in the form of a flange structure 86. Flange structure 86 is generally a byproduct of the manufacturing of cell case 72 and may be created when the film material making up the cell case 72 is sealed. As illustrated, flange structure 86 extends circumferentially around the perimeter of battery cell 48, although, this need not always be the case. In particular embodiments, terminals 62, 64 extend through portions of flange structure 86 and are at least partially covered thereby.

In preferred embodiments of the present invention, a compressive wrap 88 is disposed around the cell case 72 in covering relationship to at least a portion of planar surfaces 74, 76, and at least a portion of one of sidewall segment pairs 78, 80, 82, 84. In particularly preferred embodiments, compressive wrap is comprised of two overlapping plies 88 of a self-adhesive sheet material. In especially preferred embodiments, the sheet material is a fiberglass reinforced film that has an adhesive applied to one side thereof. However, it is within the scope of the present invention for the compressive wrap 88 to be comprised of a single ply or of a plurality of plies, and for the adhesive to be separately applied rather than be an integral part of the film material making up the wrap. The compressive wrap 88, in whatever form it takes, is operable to constrain hoop stresses acting upon the cell case 72 during thermal expansion of the cell 48. As indicated, it is common during normal operation of a lithium ion battery cell for heat to be generated. This heat will tend to cause the contents within the cell case 72, and the cell case itself, to expand. Uncontrolled expansion of the cell case 72 can lead to unpredictable failure of the cell case 72 during an untoward thermal event within the cell 48. It is an aim of certain embodiments of the present invention to prevent unpredictable failures of the cell case 72, so that venting of released flame, gas, and ejecta can be effectively managed by the other anti-propagation features described herein. Thus, while in most embodiments of the present invention, the majority of the cell case 72 is covered with compressive wrap 88, at least a portion of the cell case 72, particularly at least a portion of one of sidewall segments 78, 80, 82, 84 is left uncovered so as to create at least one predetermined point of cell case failure during a thermal event in the cell 48 through which ejecta and gas, and possibly flame, are released from the cell. In certain embodiments, the at least one predetermined point of cell case failure is located within the same sidewall segment through which terminals 62 and 64 extend, namely sidewall segments 82 and 84. Preferably, the predetermined point of cell case failure 92 is located proximate the intersection of adjacent sidewall segments, and there is at least one predetermined point of cell case failure formed in each of the uncovered sidewall segments 82, 84. Thus, the compressive wrap 88 is configured to prevent failure of the cell case 72 at any location on the cell case that that is covered by compressive wrap 88 prior to failure at the at least one predetermined point of failure 92. In certain embodiments, the material making up the compressive wrap 88 has a tensile strength of at least 2.5 MPa, and preferably from 2.5 to 10 MPa, from 3 to 9 MPa, from 4 to 8 MPa, or from 5 to 7 MPa. The material making up the compressive wrap must maintain these mechanical properties when exposed to heat sources in excess of 700° C., preferably across normal operational temperatures of −40° C. to 60° C. and when exposed to heat sources of from 60° C. to 900° C.

Optionally, a protective wrap 90 may be applied over the top of the compressive wrap 88. In certain embodiments, protective wrap 90 comprises a heat-shrink plastic sleeve that is placed around battery cell 48. The sleeve is then heated to cause wrap 90 to shrink around the cell 48. Generally, protective wrap 90 may provide some additional reinforcement for cell case 72. However, protective wrap 90, particularly when used with battery cell cases 72 that comprise aluminum composite films, provides a barrier for any exposed conductive cell case material to prevent corrosion or degradation thereof thereby helping to maintain the structural integrity of the cell case, prevent the creation of unintended weak points therein that could become hazard concerns.

The present invention further comprises methods of constraining a prismatic battery cell 48 comprising cell case 72 in which the contents of the battery cell are contained. The method comprises applying compressive wrap 88 to the cell case 72 in covering relationship to at least a portion of planar surfaces 74, 76 and at least a portion of one of the sidewall segment pairs 78, 80, 82, 84. At least one sidewall segment is left uncovered by the compressive wrap thereby creating at least one predetermined point of cell case failure 92.

In certain embodiments of the present invention, the battery cell 48 comprises at least one pliable, temperature-resistant strip of material 94 disposed on at least one side of and overlying the cell flange 86 that surrounds each terminal 62, 64. Preferably, strip 94 comprises a silicone rubber material, but it may be formed from any pliable material that is capable of maintaining its structural integrity upon being exposed to high temperatures, e.g., temperatures in excess of 300° C. Strip 94 may comprise a substantially uniform cross-sectional profile (i.e., presenting a uniform thickness), or it can be configured with a variable profile. As shown in FIG. 6, preferably strip 94 comprises a central portion 98 that at least partially overlies terminals 62, 64 and outboard portions 100, 102 that are laterally disposed from the central portion. In addition, central portion 98 may have a thickness that is greater than the thickness of outboard portions 100, 102. In certain embodiments, the thickness of central portion 98 is at least 1.5 times that of outboard portions 100, 102. Central portion 98 also need not have a width that is as wide as the width of strip 94. As shown, raised central portion 98 comprises a width that is less than the width of strip 94 so that an unraised segment 99 is located next to central portion 99 and intermediate to outboard portions 100, 102. In certain embodiments, unraised segment 99 has a thickness that is substantially equal to the thickness of outboard portions 100, 102. Also, central portion 98 may also comprise a segment 101 that protrudes beyond the margin 103 of the outboard portions 100, 102. This segment 101 offers enhanced support for the portions of terminals 62, 64 that extend beyond cell flange 86.

In certain embodiments of the invention, the cell flange 86 extends along the entire length of one of the sidewall segments 82, 84 from which at least one of the terminals 62, 64 extend. Strip 94 preferably also extends along the entire length of these sidewall segments. Preferably, strip 94 does not encroach upon or overlap cell case planar surfaces 74, 76. Rather, strip 94 resides entirely outboard of the margins of these surfaces and outboard of the margins defining sidewall segments 82, 84, although this need not always be the case.

In one aspect, as can be seen from FIG. 5, when a plurality of battery cells 48 are assembled into battery module assembly 10, strip 94 and central portion 98 in particular, provide support and mechanical protection for terminals 62, 64 and prevent physical damage thereto due to motion or vibrations of the battery module assembly, such as when being transported or installed within a vehicle. However, as explained below, strip 94 may provide a secondary function, which is to direct flames, ejecta, and gas upon being expelled through the predetermined point of cell case failure 92 during a runaway thermal event and prevent these materials from spilling over onto an adjacent battery cell 48 within module 10. In addition, strip 94 also provides protection for battery cell 48, and in particular the sidewall segments 82, 84 from which terminals 62, 64 extend, from flame, ejecta, and gas originating external to the battery cell 48 to which it is applied. Thus, strip 94 functions in certain respects as a one-way valve permitting gas, flame and ejecta originating within battery cell 48 to escape, but preventing the same materials emitted from a different battery cell from entering. It has been discovered that when strip 94 comes into contact with, for example, flames (or temperatures of approximately 700° C.) originating outside of battery cell 48, strip 94 is configured to char and not combust. This charring of strip 94 insulates battery cell 48 and helps to prevent propagation of thermal events originating outside of battery cell 48 from creating another hazardous thermal event within battery cell 48. In certain embodiments, the point of cell case failure 92 is located inboard of strip 94 so that flames, ejecta, and gas that may be produced by cell 48 during a runaway thermal event are expelled from the cell beneath the strip and not over the strip. Thus, strip 94 serves to direct these materials in a direction that is co-axial with the longitudinal axis of the battery cell 48 and in a direction toward one of the composite side panels 28, 30. Transmission of flames, ejecta, and gas laterally to an adjacent battery cell within the battery module 10 is minimized or avoided completely.

Embodiments of the present invention also provide methods of protecting battery cell 48 from physical and thermal damage by placing at least one pliable, temperature-resistant strip of material 94 as described above, on at least one side of and overlying the at least one cell flange 86 surrounding each of terminals 62, 64.

In certain embodiments of the present invention, a layered barrier material 104 is provided as a part of the battery module assembly 10 to thermally isolate and control or prevent cell-to-cell propagation of a thermal event occurring within at least one of the battery cells 48. The layered barrier material 104 is best viewed in FIG. 5. As illustrated, the barrier material 104 is posited in between cells 48 making up battery module assembly 10. Preferably, the barrier material 104 comprises at least two sheets of an anisotropic material 106, 107 having a high thermal conductivity in the in-plane direction (as opposed to in a direction normal to the sheet).

In preferred embodiments, the anisotropic material 106, 107 comprises graphitic carbon, and more preferably graphite.

One of the sheets of anisotropic material 106 is in direct facing contact with one battery cell 48. Preferably, the sheet of anisotropic material 106 is sized to substantially cover the cell case planar surface 74 when placed in direct contact therewith (or in contact with any wraps or films secured to the cell case as described above). The other sheet of anisotropic material 107 is placed in direct facing contact with another battery cell 48 that is adjacent to the first battery cell. Similarly, the other sheet of anisotropic material 107 preferably is sized to substantially cover the cell case planar surface 76 of the other battery cell 48 when placed in direct contact therewith. The anisotropic material 106, 107 is operable to direct thermal energy away from the cell surfaces 74, 76 with which it is in contact. Preferably, the anisotropic material 106, 107 conducts a significant amount of the thermal energy away from the cell toward the peripheral margins of the sheet 106, 107 as opposed to conducting the thermal energy in a direction that is normal to the sheet 106, 107 and in a direction that is toward an adjacent cell 48. In addition, the anisotropic material 106, 107 may also be operable to prevent and/or retard penetration of a flame originating from the battery cell 48 with which it is in contact in a direction toward the other, adjacent battery cell. This flame-barrier characteristic helps to protect and preserve the functionality of the other layers making up the layered barrier material 104 as described below. The anisotropic heat conduction and flame barrier functions may be performed by a single material or a plurality of materials.

As illustrated, the layered barrier material 104 further comprises at least two sheets of a thermal insulation material 108 having a high thermal resistance. It is noted, that in certain embodiments of the invention, the thermal insulation material 108 is optional, or that only one sheet of thermal insulation material 108 may be used. Thus, the following description should not be viewed as limiting upon the overall scope of the invention. In certain embodiments, the thermal insulation material 108 does not provide meaningful structural support to the layered barrier material 104 or any other portion of battery module assembly 10 and is fully pliable in response to forced acting upon it by other portions of the layered barrier material. The thermal insulation material 108 maintains its insulating properties when exposed to temperatures in excess of 800° C. In certain embodiments, the thermal insulation material 108 also remains dimensionally stable when exposed to heat and pressure. Particularly, this means that the thickness of the thermal insulation material does not substantially change when placed under compressive forces or when subjected to temperature fluctuations as might be experienced during normal battery operation or during a thermal event. In preferred embodiments, the insulation material comprises cork, wool, or fiberglass. The thermal insulation material 108 is operable to retard and/or impede the flow of heat energy originating within one of the battery cells 48 in a direction toward at least one other adjacent battery cell. It is noted that the heat energy being impeded can originate in the cell 48 that is located proximal or distal to the thermal insulation material 108. The same directional functionality is also true of the sheets of anisotropic material 106, although, its most effective thermal barrier characteristics will be provided for the cell 48 with which it is in contact.

One of the sheets of thermal insulation material 108 is positioned in direct facing contact with one of the sheets of anisotropic material 106, and one other of the sheets of thermal insulation material 108 is positioned in direct facing contact with one other of the sheets of anisotropic material 106. Preferably, the sheets of thermal insulation material 108 are sized to correspond with the sheets of anisotropic material 106, particularly so that the sheet of anisotropic material 106 substantially covers the sheet of thermal insulation material when placed in direct abutting contact therewith. In certain embodiments, the sheet of anisotropic material 106 may comprise slats 110 that extend transversely from respective longitudinal side margins of the sheet. When placed in direct facing contact with the thermal insulation material 108, slats 110 cover the longitudinal side margins of the thermal insulation material 108, thereby causing the thermal insulation material 108 to "nest" within the sheet of anisotropic material 106.

The layered barrier material 104 further comprises a compliant material 112 positioned between the at least two sheets of thermal insulation material 108. Preferably, the compliant material 112 is under compression when positioned between the sheets of thermal insulation material 108 meaning that it is compressed and/or reduced in volume from its natural or unconstrained state so that the internal forces acting within the compliant material 112 bias the material toward the unconstrained state. The compliant material 112 may be compressed, for example, when the stack 49 of battery cells is assembled and endplates 58 are secured to the ends of the stack by threaded rods 52 and nuts 60. As mentioned previously, other devices can be used to provide this compressive force such as bands or cables. In preferred embodiments, the compliant material comprises a urethane, EPDM, PVC, or silicone foam. The compliant material 112 must exhibit high compressibility (down to 25% of its original thickness) without a compression set. It must continue to exert forces on the thermal insulation material and anisotropic material when exposed to temperatures in excess of 700° C., preferably across normal operational temperatures of −40° C. to 60° C. and when exposed to heat sources of from 60° C. to 900° C. In certain aspects of the invention, the compliant material 112 is operable for maintaining the anisotropic material 106, 107 in direct facing contact with the battery cells 48 regardless of thermally-induced changes in volume that the battery cells may experience during normal cell operation. In addition, by being assembled in a compressed state, should the compliant material 112 itself experience changes in volume due to changes in temperature within the battery module assembly 10, the internal forces within the compliant material acting in an outward direction remain sufficient to remove any gaps or air pockets that may try to form in between battery cells 48 and sheets 106, 107. The slats of anisotropic material 106 may also be configured to extend over and cover the longitudinal side margins of the compliant material 112 so that the complaint material also nests within sheet 106.

Sheet of anisotropic material 107 may also be provided with slats 113 that extend transversely from respective longitudinal side margins of the sheet. In certain embodiments, slats 113 are larger than slats 110, and are configured to extend at least partially over and cover sidewall segments 78, 80 of battery cell 48. Sidewall segments 78, 80 may also have an elongate spacer 114 applied to at least a portion thereof. When the battery cells 48 are stacked and assembled, spacer 114 is positioned in between sidewall segments 78, 80 and slats 113.

With reference to FIG. 2, it is noted that battery module housing 12 has a longitudinal axis X-X that extends the length of the battery module housing and a transverse axis Y-Y that is normal to the longitudinal axis. In certain embodiments of the present invention, battery module assembly 10 is configured so that a compressive force is placed on the battery cells residing therein in directions parallel to both axes X-X and Y-Y. As discussed above, the compressive forces in a direction parallel to axis X-X may be provided by the layers of compliant material 112 that are interspersed among the various battery cells. Such compressive forces may be applied by other means as well, including the banding of the cell stack 49 together. This compressive force maintains the sheets of anisotropic material 106, 107 in direct facing contact with the battery cells 48 to ensure that thermal energy may be conducted away from battery cells 48 by sheets 106, 107. Straps 20 are positioned around battery module housing 12 and are configured to apply a compressive force to at least panels 14 and 16 in a direction that is parallel to axis Y-Y. It is noted that other structures may be used in lieu of straps 20 to supply a compressive force to panels 14, 16, and the illustrated embodiment should not be viewed as limiting.

As can be seen in FIG. 3, this compressive force causes panels 14 and 16 to remain in contact with slats 110 and/or 113 of the sheets of anisotropic material 106, 107. Panels 14, 16, and possibly the entire battery module housing, can be configured to function as a heat sink to conduct thermal energy away from battery cells 48 transmitted to it via the sheets of anisotropic material 106, 107. In order to accomplish this effectively, slats 110 and/or 113 should remain in continuous direct contact with panels 14, 16. Thus, it is a feature of certain embodiments of the present invention to compress the stack of battery cells in at least two planes so that the sheets of anisotropic material remain in continuous contact with battery cells 48 and panels 14, 16 of housing 12. Accordingly, sheets of anisotropic material 106, 107 can be viewed as devices for conducting thermal energy away from battery cells 48 and delivering it to the battery module housing 12.

The layered barrier material 104 does not need to be positioned intermediate all adjacent battery cells 48. In certain embodiments, there could be two, three, four, or any plurality of cells positioned in between each layer of layered barrier material 104. As illustrated in FIG. 5, the stack 49 of battery cells may be constructed of a plurality of repeating battery cell units 116. Each unit comprises at least two cell frames 50, at least two battery cells 48, and at least one layered barrier material 104. Note, as illustrated in FIG. 5, cell frames 50 are oriented in mirrored format as opposed to facing the same direction. Between adjacent cell units 116 one or more sheets of anisotropic material 107 may be placed. In preferred embodiments, sheets of anisotropic material 106, 107 are oriented so that slats 110, 113 all extend in the same direction away from their respective sheets.

Figure 8:
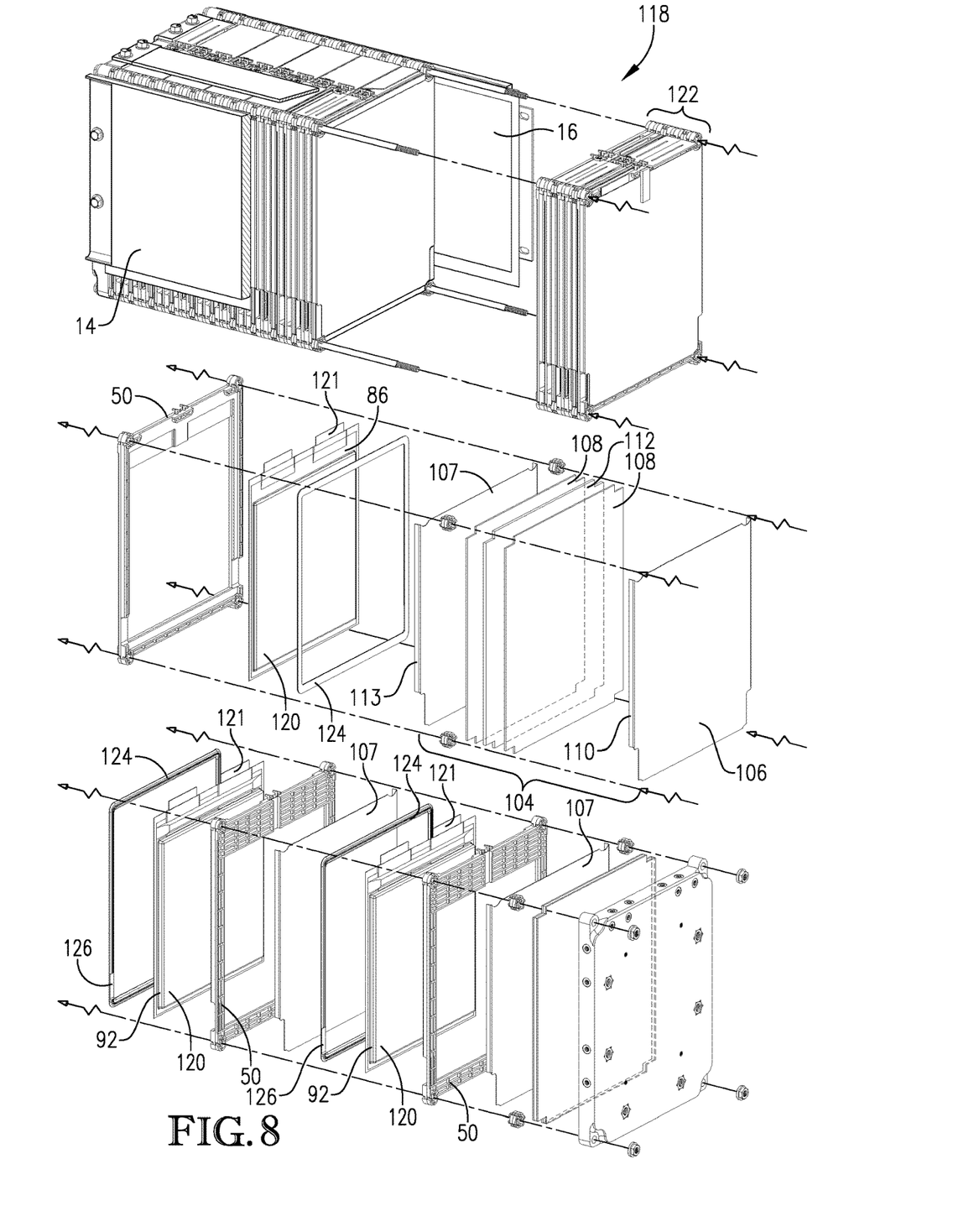
FIG. 8 is an expanded view of another embodiment of a stack of battery cell units included within a battery module assembly While the drawings do not necessarily provide exact dimensions or tolerances for the illustrated components or structures, the drawings are to scale with respect to the relationships between the components of the structures illustrated in the drawings.

FIG. 8 illustrates another embodiment of the present invention. In this embodiment, a stack 118 of battery cells 120 is assembled. The stack 118 is similar in many respects to stack 49 described above, and for the sake of expediency, such commonalities are not restated in detail below, but are clear from the Figures. Like stack 49, stack 118 is adapted to be placed within a battery module housing 12 like that described above having housing panels 14, 16. Battery cells 120 are prismatic battery cells having a pair of terminals 121 extending from the same sidewall segment and being at least partially surrounded by flange 86. Battery cells 120 are placed within cell frames 50 that are fastened together in the form of a plurality of repeating battery cell units 122. Battery cell units 122 comprise at least two battery cells 120 having a layered barrier material 104 positioned therebetween. Layered barrier material 104 may be configured as previous described above and comprise sheets of anisotropic material 106, 107, optional sheets of thermal insulation material 108, and at least one layer of a compliant material 112.

Each battery cell 120 further comprises a bead 124 of a pliable, temperature-resistant material disposed about a majority of the periphery of the sidewall segments of the battery cell. The bead 124 may comprise the same material use to construct pliable strips 94 described above. Bead 124 overlies at least a portion of the cell flange 86 and is operable to apply a compressive force to the outer cell case, and particularly the sidewall segments to constrain the sidewall segments and prevent rupture of the cell case at unintended points along the various sidewall segments. Bead 124 may be continuous (i.e., one piece as is illustrated in FIG. 8) or discontinuous (i.e., made up of discrete segments) that are individually placed around cell 120. In certain embodiments, bead 124 may be provided with one or more recessed areas 126 or areas of reduced thickness. Recessed areas 126 represent correspond with predetermined points of cell case failure 92 where controlled cell case rupture during a thermal event is to occur. Thus, preferably, bead 124 provides support and reinforcement for the majority of the sidewall segment circumference, except for those portions corresponding with recessed areas 126. It is noted that in the case of a discontinuous bead, recessed areas 126 may actually be void of any bead material.

In certain embodiments, battery cells 120 are not reinforced with a compressive wrap 88 as battery cells 48 may be. Thus, in addition to performing the functions of vibration protection for terminals 121 and a flame barrier for preventing entry of flame originating external to cell 120, bead 124 is configured to constrain the cell sidewalls by providing a compressive force thereto. This compressive force provided by bead 124 reinforced the cell case and prevents cell case failure at locations other than predetermined points 92.

Generally, battery cell stack 118 may be substituted for cell stack 49 and placed within a battery module housing 12 configured as described above, and except as noted above, the operation of such a battery module 10 remains the same as previously described.

Embodiments of the present invention also provide methods of thermally isolating battery cells 48 within battery module assembly 10. The method comprises positioning layered barrier material 104 in between at least two adjacent battery cells 48. The positioning of the layered barrier material 104 comprises placing a first sheet of the anisotropic material 106 in direct facing contact with a first battery cell 46, placing a first sheet of the thermal insulation material 108 in direct facing contact with the first sheet of anisotropic material 106, placing a second sheet of the anisotropic material 106 in direct facing contact with a second battery cell, placing a second sheet of the thermal insulation material 108 in direct facing contact with a the second sheet of anisotropic material 106, and positioning the compliant material 112 between the first and second sheets of thermal insulation material 108. The compliant material 112 is maintained under compression between the first and second sheets of thermal insulation material 108.

Battery module assembly 10 can have a variety of applications. In a preferred application, a plurality of battery module assemblies 10 can be provided in a stack or cabinet, and even a plurality of cabinets of battery module assemblies provided, to form a battery system. The battery module assembly 10 or a battery system comprising a plurality of battery module assemblies can be used to provide power to a vehicle, such as a car, truck, boat, aircraft, hyperloop pod, mining equipment, aviation ground service equipment, or locomotive. A preferred application for battery module assembly 10 is use within a battery system that is installed within a marine vessel. The marine vessel can be a cargo ship, a passenger ship, a ferry, a hovercraft, a military craft, or the like. Moreover, the battery system comprising battery module assembly 10 may be the only power source provided on board the marine vessel, or it can be provided as one component of a hybrid power system. The battery system comprising battery module assembly 10 may be used to provide propulsion for the vehicle, to provide power for other onboard vehicle systems, or both.

It is understood that the present invention can be practiced employing one or more of the various features and elements described herein. The fact that the embodiments shown in the figures and described above show combinations of elements assembled in a particular manner should not be taken as limiting on the scope of the present invention, nor should it be taken as requiring all of said features or elements to be present in order to successfully practice the present invention.

We claim:

1. A battery module assembly comprising a battery module housing configured to house a plurality of battery cells, the battery module housing comprising at least one composite panel comprising an outboard metallic or non-metallic structural layer, an inboard layer of an FR4-rated sheet material, and at least one graphitic carbon sheet positioned therebetween, wherein the composite panel defines at least in part a passageway configured to conduct a flow of ejecta and gas from a thermal event associated with one or more battery cells within the battery module housing toward an outlet formed in the housing.

2. The battery module assembly of claim 1, wherein the housing further comprises at least one side panel positioned transversely relative to the composite panel, the outlet being formed in the at least one side panel.

3. The battery module assembly of claim 2, wherein the outlet is normally covered with a rupturable diaphragm configured to open in response to the thermal event and permit communication between the passageway and the exterior of the housing.

4. The battery module assembly of claim 1, wherein the outboard structural layer comprises aluminum, carbon fiber, or a synthetic resin material.

5. The battery module assembly of claim 1, wherein the FR4-rated sheet material comprises a woven fiberglass and epoxy resin laminate material.

6. The battery module assembly of claim 1, wherein the battery module assembly further comprises one or more busbars operable to connect the plurality of battery cells located within the housing.

7. The battery module assembly of claim 6, wherein the battery module assembly further comprises one or more busbar shields configured to at least partially cover the one or more busbars and shield electrical components located outboard of the one or more busbars and within the passage from contacting the one or more busbars during a thermal event associated with one or more of the plurality of battery cells.

8. The battery module assembly of claim 7, wherein the one or more busbar shields comprise an FR4-rated sheet material.

9. The battery module assembly of claim 1, wherein the one or more battery cells comprise lithium ion battery cells.

10. The battery module assembly of claim 1, further comprising a layered barrier material disposed in between at least two of the plurality of battery cells, the layered barrier material configured to thermally isolate and control or prevent cell-to-cell propagation of a thermal event occurring within at least one of the battery cells, the layered barrier material comprising:
at least two sheets of an anisotropic material, at least one of the sheets of anisotropic material being in direct facing contact with one of the at least two battery cells, and at least one other of the sheets of anisotropic material being in direct facing contact with one other of the at least two battery cells.

11. The battery module assembly of claim 10, wherein the at least two sheets of anisotropic material have a high thermal conductivity in the in-plane direction and are operable to direct thermal energy away from a surface of the cell with which the sheet is in contact, the at least two sheets of anisotropic material are operable to prevent and/or retard penetration of a flame originating from the battery cell with which it is in contact in a direction toward the at least one other battery cell.

12. The battery module assembly of claim 11, where the anisotropic material comprises graphitic carbon.

13. The battery module assembly of claim 10, the layered barrier material further comprising:
at least two sheets of a thermal insulation material, one of the at least two sheets of thermal insulation material being positioned in direct facing contact with one of the at least two sheets of anisotropic material, and the other of the at least two sheets of thermal insulation material being positioned in direct facing contact with the other of the at least two sheets of anisotropic material; and
a compliant material positioned between the at least two sheets of thermal insulation material under compression, the compliant material being operable for maintaining the at least two sheets of anisotropic material in direct facing contact with the at least two battery cells.

14. The battery module assembly of claim 13, wherein the at least two sheets of thermal insulation material are operable to retard and/or impede the flow of heat originating within one of the battery cells in a direction toward the at least one other battery cell.

15. The battery module assembly of claim 14, wherein the thermal insulation material comprises cork, wool, or fiberglass.

16. The battery module assembly of claim 13, wherein the compliant material is operable for maintaining the at least two sheets of anisotropic material in direct facing contact with the at least two of the plurality of battery cells regardless of thermally-induced changes in volume that the at least two of the plurality of battery cells may experience during normal cell operation.

17. The battery module assembly of claim 16, wherein the compliant material comprises urethane, EPDM, PVC, or silicone foam.

18. A battery module assembly of claim 1, wherein the plurality of battery cells comprises a plurality of prismatic battery cells, one or more of the prismatic battery cells comprising:
(i) an outer cell case in which the contents of the battery cell are contained, the cell case presenting a pair of opposed, generally planar surfaces interconnected by opposed sidewall segment pairs; and
(ii) a compressive wrap disposed around the cell case in covering relationship to at least a portion of the planar surfaces and at least a portion of one of the sidewall segment pairs, the compressive wrap being operable to constrain hoop stresses acting upon the cell case during thermal expansion of the cell, there being at least one sidewall segment of one of the sidewall segment pairs that is uncovered by the compressive wrap and configured to create at least one predetermined point of cell case failure during a thermal event in the cell through which ejecta and gas are released from the cell.

19. A vehicle comprising a battery module assembly according to claim 1.

* * * * *

UNITED STATES PATENT AND TRADEMARK OFFICE
CERTIFICATE OF CORRECTION

| | | |
|---|---|---|
| PATENT NO. | : 12,095,112 B2 | Page 1 of 1 |
| APPLICATION NO. | : 17/490561 | |
| DATED | : September 17, 2024 | |
| INVENTOR(S) | : Mabrey et al. | |

It is certified that error appears in the above-identified patent and that said Letters Patent is hereby corrected as shown below:

On the Title Page

Item (73) Assignee, Please change "Spear Power Systems, Inc. 4200 E. 138$^{TH}$ STREET GRANDVIEW, MISSOURI 64030" to --Blue Origin Alabama, LLC 1100 Explorer Blvd NW Huntsville, Alabama 35806--.

Signed and Sealed this
Fourth Day of November, 2025

John A. Squires
*Director of the United States Patent and Trademark Office*